US008990419B2

(12) United States Patent
Tamiya

(10) Patent No.: US 8,990,419 B2
(45) Date of Patent: Mar. 24, 2015

(54) INFORMATION PROCESSING APPARATUS AND METHOD THEREFOR

(71) Applicant: Canon Kabushiki Kaisha, Tokyo (JP)

(72) Inventor: Keisuke Tamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 13/649,487

(22) Filed: Oct. 11, 2012

(65) Prior Publication Data

US 2013/0110945 A1    May 2, 2013

(30) Foreign Application Priority Data

Nov. 2, 2011    (JP) .................................. 2011-241527

(51) Int. Cl.
| | | |
|---|---|---|
| *G06F 15/16* | (2006.01) | |
| *H04N 7/18* | (2006.01) | |
| *H04N 21/218* | (2011.01) | |
| *H04N 21/231* | (2011.01) | |
| *H04N 21/232* | (2011.01) | |
| *H04N 21/61* | (2011.01) | |
| *H04N 21/654* | (2011.01) | |
| *H04N 21/658* | (2011.01) | |
| *H04N 21/84* | (2011.01) | |
| *H04N 21/845* | (2011.01) | |

(52) U.S. Cl.
CPC ......... *H04N 7/181* (2013.01); *H04N 21/21805* (2013.01); *H04N 21/23109* (2013.01); *H04N 21/232* (2013.01); *H04N 21/6125* (2013.01); *H04N 21/6175* (2013.01); *H04N 21/654* (2013.01); *H04N 21/6581* (2013.01); *H04N 21/84* (2013.01); *H04N 21/8456* (2013.01)
USPC ............................ 709/231; 709/203; 709/217

(58) Field of Classification Search
USPC ......... 709/203, 217, 219, 223, 224, 230–232; 725/38, 100, 110, 133, 134
See application file for complete search history.

(56) References Cited

U.S. PATENT DOCUMENTS

| | | | |
|---|---|---|---|
| 7,036,150 B2 * | 4/2006 | Onishi et al. .................... 726/28 |
| 7,039,784 B1 * | 5/2006 | Chen et al. .................... 711/170 |
| 7,461,168 B1 | 12/2008 | Wan | |
| 7,539,292 B2 * | 5/2009 | Tanabe et al. ............. 379/90.01 |
| 8,352,602 B2 * | 1/2013 | Medard et al. ............... 709/225 |
| 8,499,058 B2 * | 7/2013 | Nakao .......................... 709/219 |
| 2001/0051958 A1 * | 12/2001 | deVries et al. ................ 707/511 |
| 2008/0148168 A1 * | 6/2008 | Koran et al. .................. 715/771 |

(Continued)

FOREIGN PATENT DOCUMENTS

JP    2001-184243 A    7/2001

*Primary Examiner* — Lashonda Jacobs
(74) *Attorney, Agent, or Firm* — Fitzpatrick, Cella, Harper & Scinto

(57) ABSTRACT

A table is generated in which content information for digital contents and the relation between the digital contents are registered. A request message indicating a content identifier and data range of a requested digital content is received. A determination is made regarding the presence of a digital content corresponding to the requested digital content based on the table and the content identifier indicated by the request message, and a determination is made regarding a data range based on the table and the data range indicated by the request message. Based on the results of the determinations, the content identifier and data range of the digital content corresponding to the data range indicated by the request message are decided by referring to the table. A message to the request message is transmitted based on the determinations and the decision.

19 Claims, 15 Drawing Sheets

(56) References Cited

U.S. PATENT DOCUMENTS

| | | | |
|---|---|---|---|
| 2008/0306962 A1* | 12/2008 | Grannan et al. | 707/10 |
| 2009/0300685 A1* | 12/2009 | Easter | 725/62 |
| 2010/0287067 A1* | 11/2010 | Abramowitz et al. | 705/27 |
| 2011/0022684 A1* | 1/2011 | Nakao | 709/219 |
| 2012/0331170 A1* | 12/2012 | Grannan et al. | 709/231 |
| 2013/0006980 A1* | 1/2013 | Frumin | 707/736 |
| 2013/0179541 A1* | 7/2013 | Chen | 709/219 |
| 2013/0236160 A1* | 9/2013 | Gentile et al. | 386/248 |

* cited by examiner

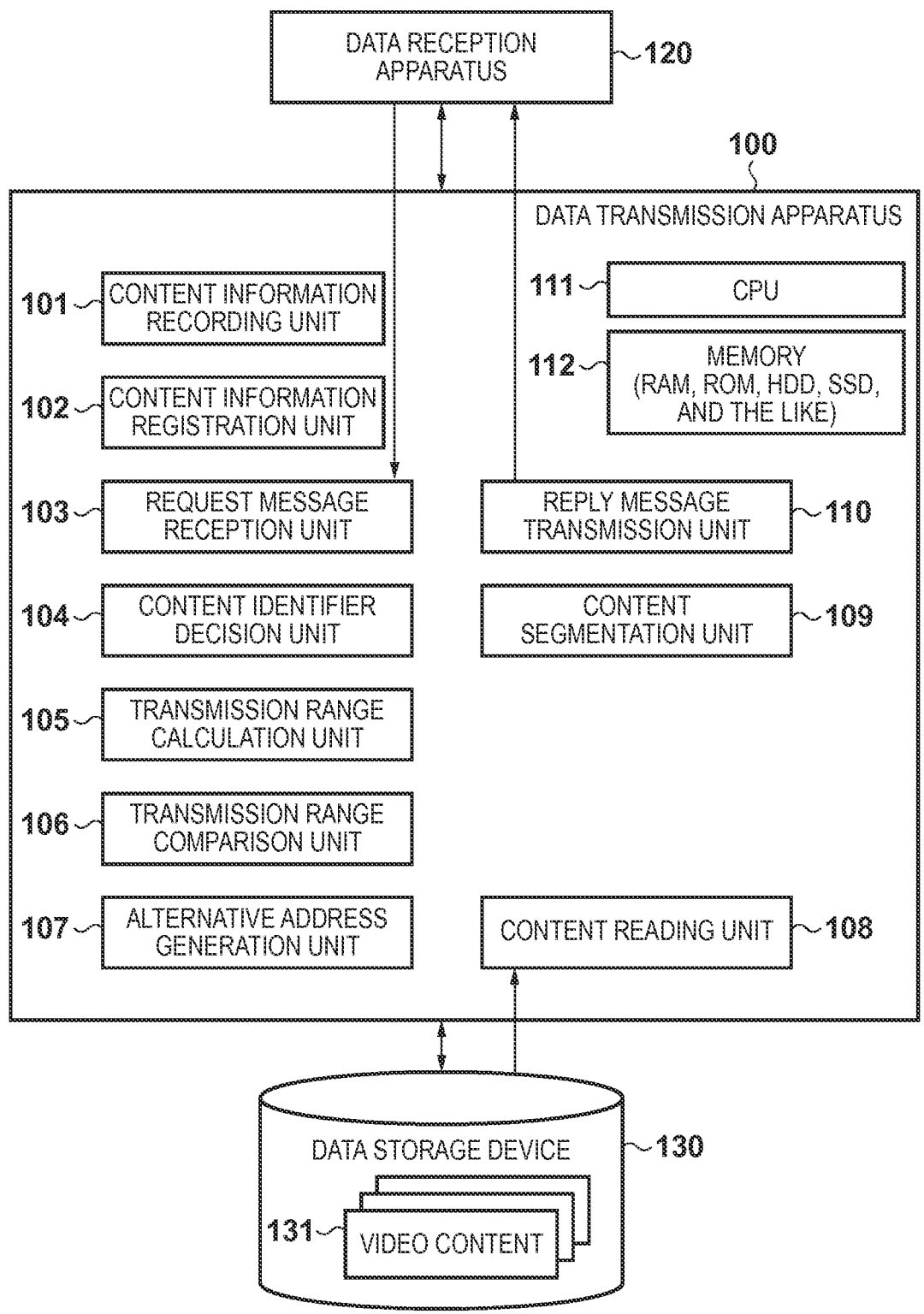

FIG. 3

| 401 | 402 | 403 |
|---|---|---|
| CONTENT IDENTIFIER | CONTENT COORDINATE | CONTENT RANGE |
| 20110401-00.mp4 | 2011/04/01 00:00 | 7200 |
| 20110401-01.mp4 | 2011/04/01 02:00 | 10800 |
| [FILLER] | 2011/04/01 05:00 | 36000 |
| 20110401-02.mp4 | 2011/04/01 15:00 | 7200 |
| 20110401-03.mp4 | 2011/04/01 17:00 | 14400 |
| 20110401-04.mp4 | 2011/04/01 21:00 | 7200 |
| [SEPARATOR] | N/A | N/A |
| 20110402-00.mp4 | 2011/04/02 00:00 | 18000 |
| ... | ... | ... |

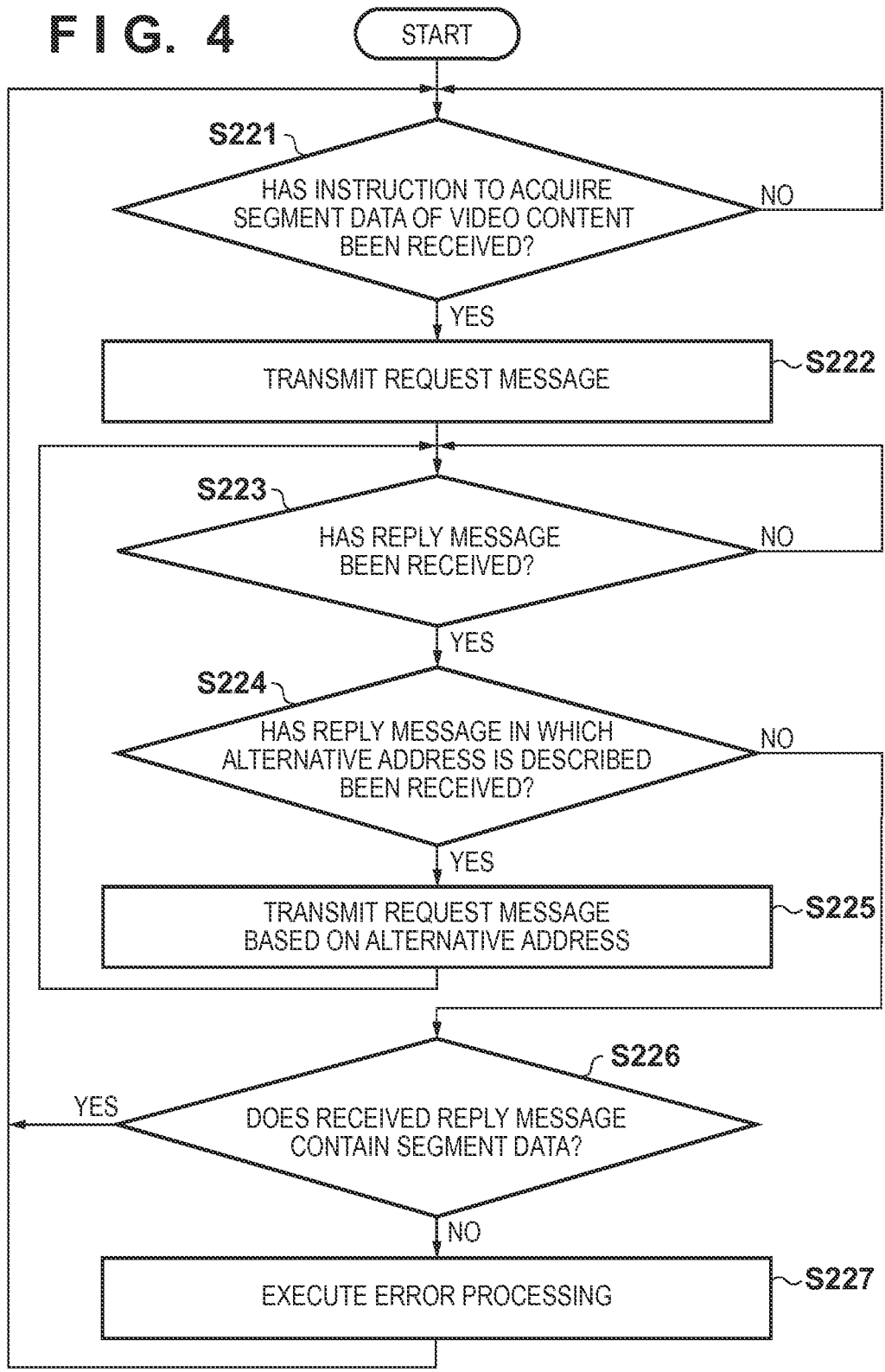

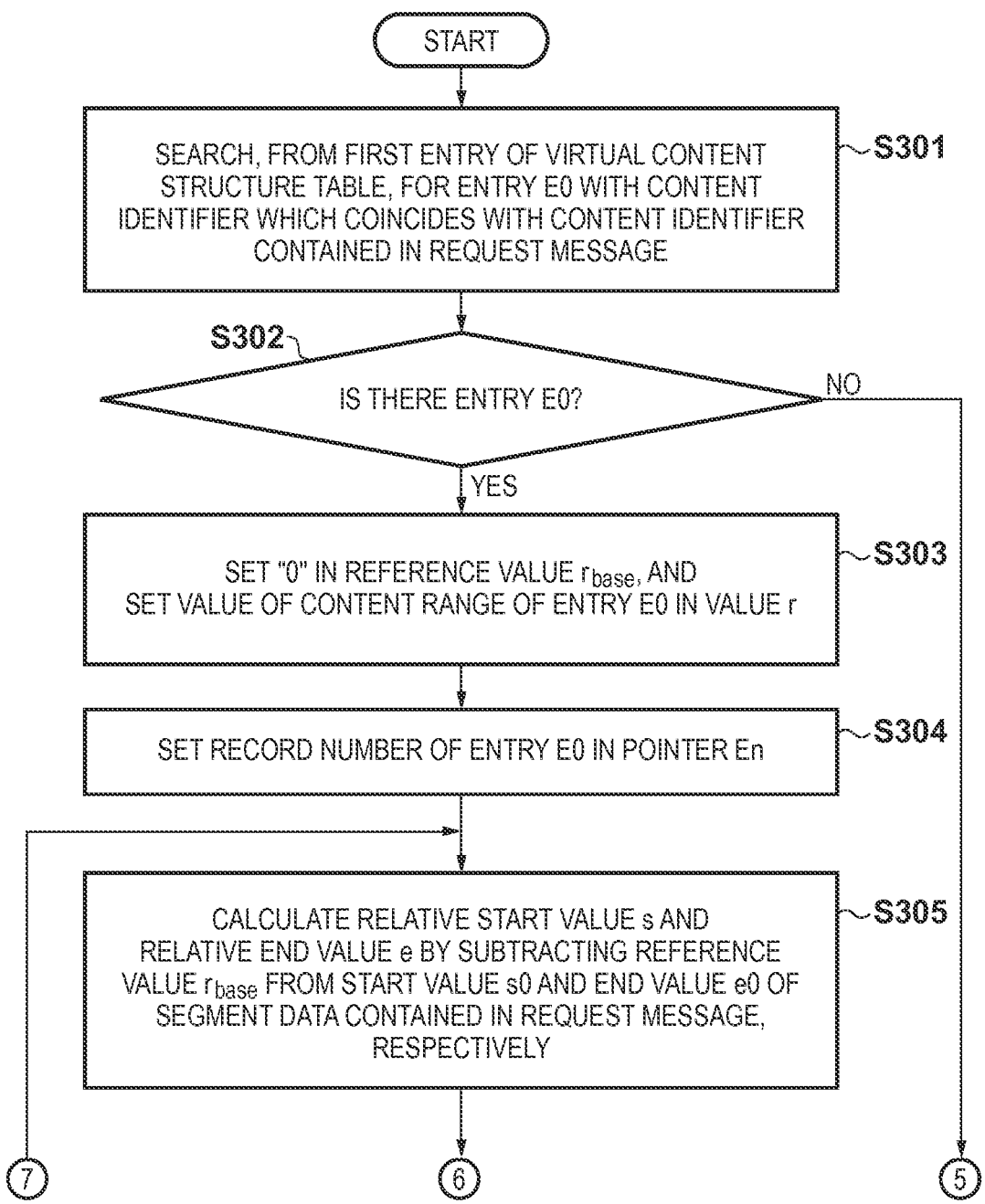
F I G. 6A

FIG. 10

| CONTENT IDENTIFIER | CONTENT COORDINATE | CONTENT RANGE | CONTENT TRANSFER DESTINATION |
|---|---|---|---|
| 20110401-00.mp4 | 2011/04/01 00:00 | 7200 | http://www.example1.com/camera1-20110401-00.mp4#t=0,7200 |
| 20110401-01.mp4 | 2011/04/01 02:00 | 10800 | http://www.example2.com/camera1-20110401-01.mp4#t=0,10800 |
| [FILLER] | 2011/04/01 05:00 | 36000 | N/A |
| 20110401-02.mp4 | 2011/04/01 15:00 | 7200 | N/A |
| 20110401-03.mp4 | 2011/04/01 17:00 | 14400 | N/A |
| 20110401-04.mp4 | 2011/04/01 21:00 | 7200 | N/A |
| [SEPARATOR] | N/A | N/A | N/A |
| 20110402-00.mp4 | 2011/04/02 00:00 | 18000 | N/A |
| ... | ... | ... | ... |

401　402　403　404

INFORMATION PROCESSING APPARATUS AND METHOD THEREFOR

BACKGROUND OF THE INVENTION

1. Field of the Invention

The present invention relates to information processing of transmitting multimedia contents through a computer network.

2. Description of the Related Art

Conventionally, RFC 3986 released by the Internet Engineering Task Force (IETF) defines a method of describing a uniform resource identifier (URI) for identifying a resource such as a file on a network. According to this definition, the user of a URI can express a subordinate resource such as partial data of a main resource by adding a description called a fragment identifier as part of the URI.

Furthermore, the World Wide Web Consortium (W3C) is developing the specifications of a media fragment URI representing, with a fragment identifier, data obtained by fragmenting a multimedia content such as a moving picture in terms of a time, coordinate, or track type (image, audio, subtitles, and the like). According to the specifications, when acquiring a moving picture from an apparatus for distributing a moving picture, a terminal apparatus for playing back a moving picture or the like can designate part of the moving picture as an acquisition target using a URI including a fragment identifier.

If a resource to be acquired is on a Web server, hypertext transfer protocol (HTTP)/1.1 defined as a communication protocol in RFC 2068 is often used.

On the other hand, if a surveillance camera connected to a network has a small storage capacity for data storage, it segments recorded video data by a predetermined data size or a predetermined time interval, and uploads the segmented recorded video data as separate files to a server used for data storage. If the server used for data storage has a Web server function, the user of the surveillance camera uses a Web browser to issue a request to transmit the stored files as video contents.

Furthermore, video data of a specific location or event, which have been shot by a plurality of cameras, are often uploaded as separate files to a storage service provided as a cloud service. If the storage service has a Web server function, the user of the service uses a Web browser to issue a request to transmit the stored files as video contents.

If, however, a request range of a video content is designated by a media fragment URI description, that is, segment data of a video content is requested, data for the request range may not exist in the video content. In the above surveillance camera example or storage service example, segment data for the request range exist not in a file (to be referred to as a designated file hereinafter) designated by a media fragment URI but in a different file.

Even if the segment data for the request range exists, if it is in another file, the Web server cannot identify the relation between the designated file and the other file, and thus cannot specify the segment data. Consequently, the Web server cannot acquire the segment data for the request range from the video content of the designated file, and thus replies an error message to the Web browser, or supplies the whole video content of the designated file to a client on which the Web browser operates in order to delegate subsequent processing to the Web browser. In other words, the Web browser cannot acquire the data even though the segment data for the request range exists in the Web server.

SUMMARY OF THE INVENTION

In one aspect, an information processing apparatus comprising: a generator configured to generate a table in which content information for a plurality of digital contents stored in a memory and a relation between the plurality of digital contents are registered; a receiver configured to receive a request message indicating a content identifier and a data range of a requested digital content; a determiner configured to perform a first determination regarding presence of a digital content corresponding the requested digital content based on the table and the content identifier indicated by the request message and a second determination regarding the data range based on the table and the data range indicated by the request message; a decider configured to decide a content identifier and a data range of a digital content corresponding to the data range indicated by the request message based on results of the first determination and the second determination by referring to the table; and a transmitter configured to transmit a reply message to the request message based on the first determination, the second determination, and the decision.

According to the aspect, even if a requested data range is included not in a requested digital content but in another digital content, it is possible to reply information regarding the other digital content.

Further features of the present invention will become apparent from the following description of exemplary embodiments with reference to the attached drawings.

BRIEF DESCRIPTION OF THE DRAWINGS

FIG. 1 is a block diagram for explaining the configuration of a multimedia content transmission/reception system according to the first embodiment.

FIG. 3 is a table showing an example of a virtual content structure table.

FIG. 4 is a flowchart for explaining the operation of a data reception apparatus.

FIGS. 6A and 6B are flowcharts for explaining content decision processing.

FIG. 10 is a table showing an example of a virtual content structure table according to the second embodiment.

DESCRIPTION OF THE EMBODIMENTS

Information processing according to embodiments of the present invention will be described in detail with reference to the accompanying drawings. Note that although a video content as a representative multimedia content will be explained as an example of a requested digital content, it is also possible to deal with other types of digital contents including audio, sound, and photos.

First Embodiment

System Configuration

The configuration of a multimedia content transmission/reception system according to the first embodiment will be described with reference to a block diagram shown in FIG. 1.

Referring to FIG. 1, a data transmission apparatus 100 and a data reception apparatus 120 are connected to a network, and can make data communication with each other through the network. The data transmission apparatus 100 is connected with a data storage device 130 storing multimedia contents (for example, video contents) 131.

The data transmission apparatus 100 is, for example, a surveillance camera, a video recording apparatus, a digital video camera, or the like. The data reception apparatus 120 is an apparatus such as a television, or a video viewer or web browser operating on a communication terminal such as a personal computer (PC) or a smartphone. Note that although FIG. 1 shows a case in which the data transmission apparatus 100 and data storage device 130 are separate apparatuses, the data transmission apparatus 100 may be integrated with the data storage device 130.

Furthermore, a video content is segmented into files and the separate files (to be referred to as segmented contents hereinafter) are stored in the data storage device 130. A video content may be segmented when or after recording the video. A content obtained by combining a plurality of segmented contents to form one logical group will be referred to as a "virtual content".

●Data Transmission Apparatus

A microprocessor (CPU) 111 controls the operation of the data transmission apparatus 100 as a whole by executing an operating system (OS) or a program stored in a read only memory (ROM) or a hard disk drive (HDD) of a memory 112 using a random access memory (RAM) of the memory 112 as a work memory. Note that the memory 112 includes the RAM, the ROM, the HDD, and a solid-state drive (SSD).

Each arrangement of the data transmission apparatus 100 to be described below may include hardware components or software components. If each arrangement includes software components, the software components for implementing the functions of the arrangement are stored in the ROM, HDD, SSD, and the like of the memory 112, and the CPU 111 loads the software components to execute them, thereby implementing the functions of the arrangement.

Figure 2A:
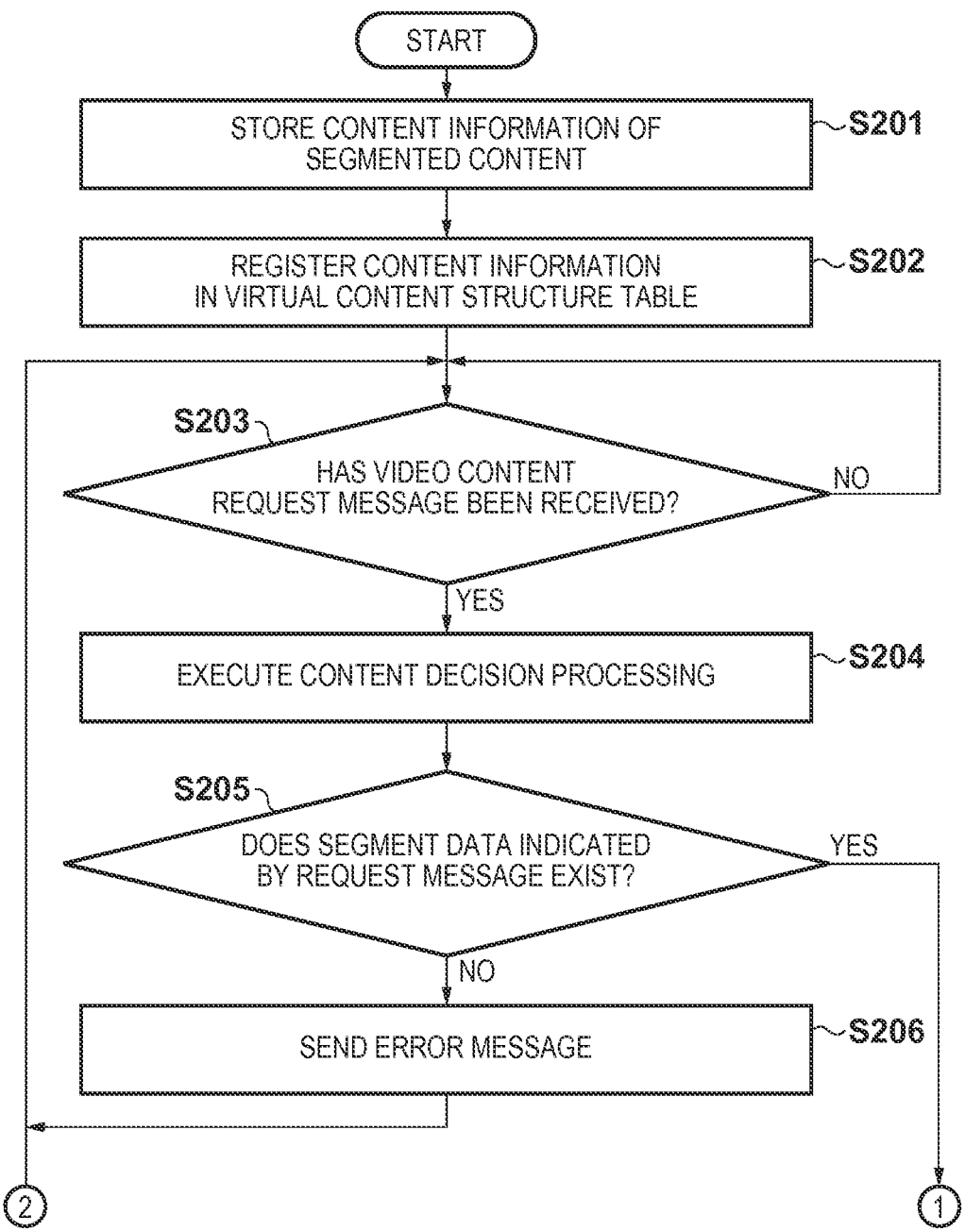
FIGS. 2A and 2B are flowcharts for explaining the operation of a data transmission apparatus.
Figure 2B:
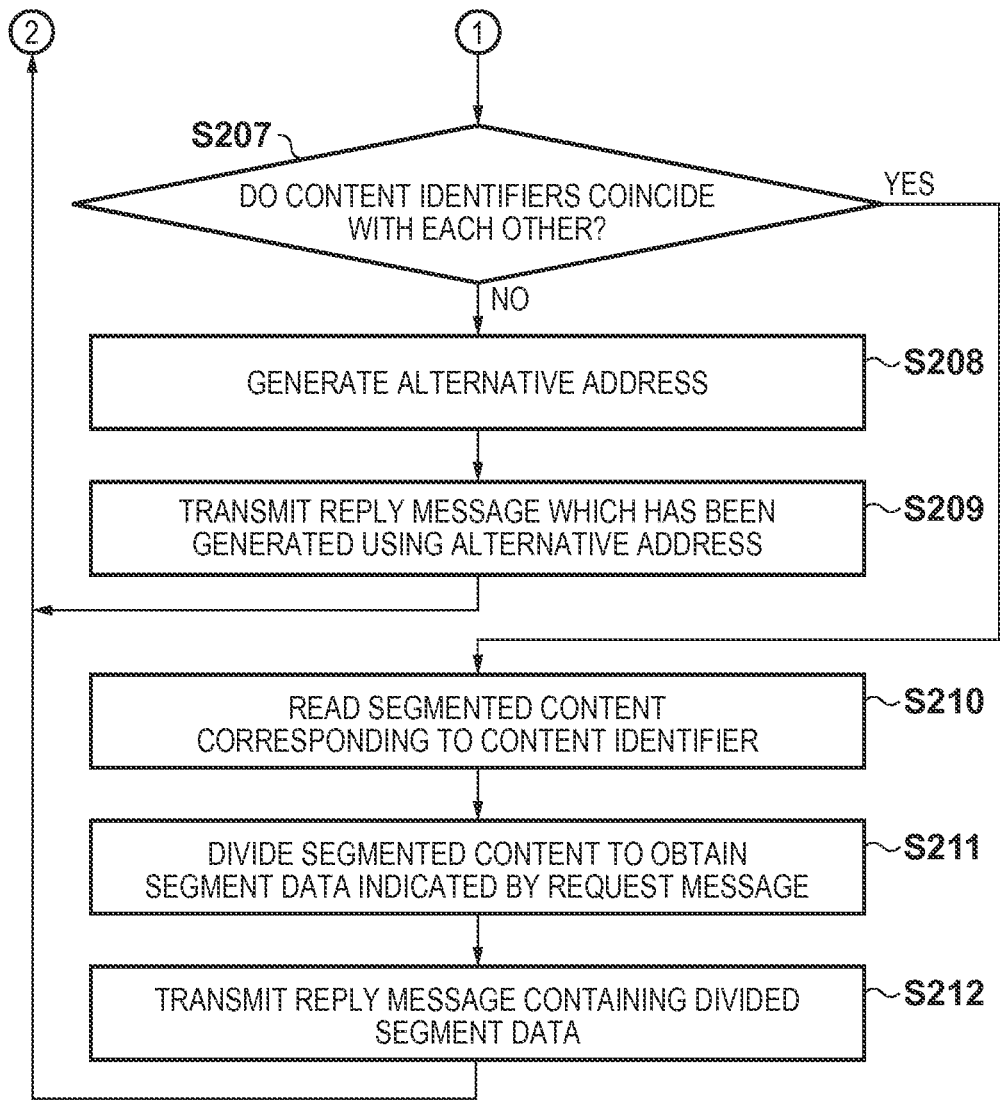

The operation of the data transmission apparatus 100 will be described with reference to flowcharts shown in FIGS. 2A and 2B.

When an event of newly storing a segmented content in the data storage device 130 occurs, the CPU 111 causes a content information recording unit 101 to store content information of the segmented content (S201). The content information is stored in a meta information storage area (for example, an MP4 moov container or the like) of a file of a video content, a separate file in the data storage device 130, the memory 112, or the like.

The content information is meta information when the data transmission apparatus 100 stores recorded video data (a segmented content), and includes a content identifier, content coordinate, and content range. The content identifier is used to uniquely discriminate a content in the data storage device 130, and is, for example, the file name of the segmented content. The content coordinate is information (for example, the recording start date/time of each segmented content) indicating the order of a plurality of segmented contents on a specific axis (for example, a time axis). The content range represents the range of the coordinates of the segmented contents on the axis, and is, for example, a recording time.

Note that the axis and content coordinate are respectively not limited to a time, and need only be a reference value indicating the order of segmented contents such as an image shooting position, the search hit rate of an image or document, the order of images or documents in an organization list or schedule table.

Next, the CPU 111 causes a content information registration unit 102 to acquire pieces of content information for the segmented contents stored in the data storage device 130, and register them in a table in the order of the values of content coordinates (S202), details of which will be described later. Note that hereinafter the table will be referred to as a "virtual content structure table".

FIG. 3 shows an example of the virtual content structure table. In the virtual content structure table, a content identifier column 401 indicates a content identifier (for example, a file name); a content coordinate column 402, the value of a content coordinate (for example, a recording start date/time); and a content range column 403, a content range (for example, a recording time in seconds). Note that records in the virtual content structure table are arranged in the order of the recording start date/time.

In the virtual content structure table, an identifier [FILLER] indicates a gap between the recording end date/time of a preceding segmented content and the recording start date/time of a subsequent segmented content. If the recording end date/time of the preceding segmented content does not coincide with the recording start date/time of the subsequent segmented content in registering the content information, the content information registration unit 102 registers a pseudo content as a symbol indicating an unrecording time, and adds the content identifier "FILLER". Note that the pseudo content will be referred to as a "filler content" hereinafter. Therefore, the content coordinate of the filler content is the recording end date/time of the preceding segmented content, and the content range has a value indicating an unrecording time (a difference between the recording end date/time of the preceding segmented content and the recording start date/time of the subsequent content).

If the content information registration unit 102 wants to add a logical separator between segmented contents, it can register a pseudo content (to be referred to as a separator content hereinafter) with a content identifier [SEPARATOR] as a symbol. FIG. 3 shows a case in which a separator content is registered at a date change point. A value indicating "not available (N/A)" is used as the values of the content coordinate and content range of the separator content.

After registration of the content information (S202), the CPU 111 causes a request message reception unit 103 to stand by for reception of a video content request message (S203). Upon receiving a request message from the data reception apparatus 120, the CPU 111 executes content decision processing (S204). Note that details of the content decision processing will be described later.

A description when segment data for a data range from 7300 seconds to 7310 seconds of a video content with a content identifier "20110401-00.mp4" is requested of the data transmission apparatus 100 with a URL (uniform resource locator) "www.example.com" is as follows.

http://www.example.com/20110401-00.mp4#t=7300,
7310 . . . (1)

Note that although the above media fragment URI is generated by the user interface (UI) of the data reception apparatus 120 or the link description of a Web page displayed in the data reception apparatus 120, it may be generated using another method.

Upon generation of the above media fragment URI, the data reception apparatus 120 transmits the following request message represented according to the HTTP protocol. Note that a value described in the following Range header indicates segment data.

Figure 7:
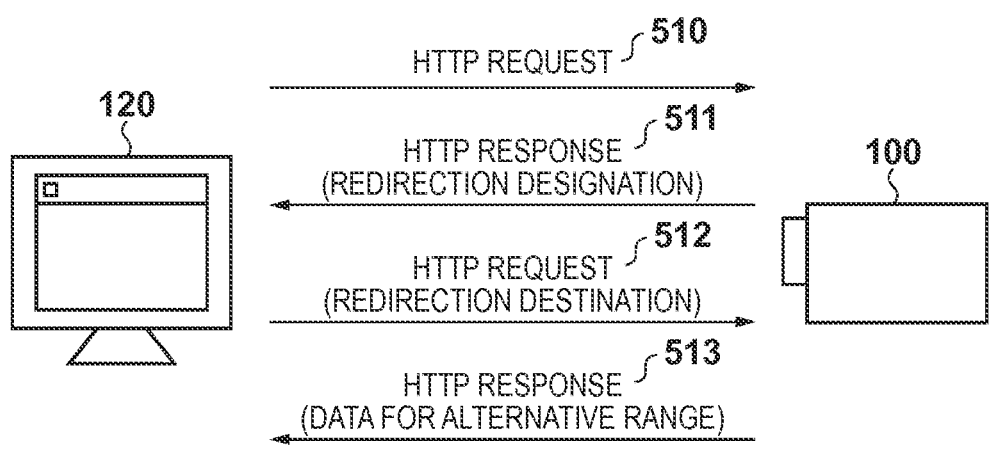
FIG. 7 is a view for explaining a message flow between the data reception apparatus and the data transmission apparatus using the HTTP protocol.

GET /20110401-00.mp4 HTTP/1.1
Host: www.example.com
Accept: video/*
Range: t:npt=7300-7310 . . . (2)
:

FIG. 7 is a view for explaining a message flow between the data reception apparatus 120 and the data transmission apparatus 100 using the HTTP protocol. A message 510 corresponds to a request message which is received by the data transmission apparatus 100 from the data reception apparatus 120 in step s203.

If segment data indicated by the request message exists as a result of the content decision processing (S204), the CPU 111 decides the content identifier, start coordinate value, and end coordinate value of a segmented content, and sets them in a return value. If the segment data indicated by the request message does not exist, the CPU 111 sets NULL in a return value.

Upon completion of the content decision processing (S204), the CPU 111 refers to the return value of the content decision processing to determine whether the segment data indicated by the request message exists (S205). If the return value is NULL, the CPU 111 causes a reply message transmission unit 110 to send, to the data reception apparatus 120, the following error message indicating that the segment data indicated by the request message does not exist (S206).

HTTP/1.1 404 Not Found . . . (3)
:

On the other hand, if the return value is not NULL, the CPU 111 compares a content identifier contained in the request message with that included in the return value (S207). If the content identifier contained in the request message is different from that included in the return value, the CPU 111 causes an alternative address generation unit 107 to generate an alternative address indicating the position of alternative data (S208).

The alternative data has a content identifier different from that of the request but has the same content coordinate as that of the request. The alternative address is formed by the URL of the data transmission apparatus 100, and the content identifier, start coordinate value, and end coordinate value of the segmented content which are included in the return value, as given below.

http://www.example.com/20110401-01.mp4#t=100,110
. . . (4)

The CPU 111 then causes the reply message transmission unit 110 to send, to the data reception apparatus 120, the following reply message which has been generated using the alternative address (S209). The following message is an example of a reply message using the redirection function of the HTTP protocol.

HTTP/1.1 301 Moved Permanently
Location: http://www.example.com/20110401-01.mp4#t=100,110 . . . (5)
:

Referring to FIG. 7, a message 511 corresponds to a reply message which is transmitted from the data transmission apparatus 100 to the data reception apparatus 120 in step S209. Furthermore, a message 512 corresponds to a request message (indicating a redirection destination) which is received by the data transmission apparatus 100 from the data reception apparatus 120 in step S203 in response to the message 511.

Alternatively, if the content identifier contained in the request message coincides with that included in the return value, the CPU 111 causes a content reading unit 108 to read a segmented content corresponding to the content identifier from the data storage device 130 (S210). Then, the CPU 111 causes a content segmentation unit 109 to divide the segmented content to obtain the segment data indicated by the request message (S211), and the reply message transmission unit 110 to send a reply message containing the divided segment data to the data reception apparatus 120 (S212). The following message is an example of the reply message.

HTTP/1.1 206 Partial Content
Accept-Ranges: bytes
Content-Length: 3743
Content-Type: video/mp4
Content-Range: bytes 19147-22800/35614993 . . . (6)
:
(Binary Data)

Referring to FIG. 7, a message 513 corresponds to the reply message which contains the divided segment data (data for an alternative range) and is transmitted from the data transmission apparatus 100 to the data reception apparatus 120 in step S212.

After step S206, S209, or S212, the CPU 111 returns the process to step S203 to stand by for reception of a video content request message. If, for example, an interrupt indicating an event of newly storing a segmented content in the data storage device 130 occurs while standing by for reception of a video content request message, the CPU 111 returns the process to step S201.

●Data Reception Apparatus

The operation of the data reception apparatus 120 will be described with reference to a flowchart shown in FIG. 4.

Upon receiving an instruction to acquire segment data of a video content (S221), the data reception apparatus 120 transmits a request message for the segment data to the data transmission apparatus 100 (S222), and stands by for reception of a reply message from the data transmission apparatus 100 (S223).

Upon receiving a reply message, the data reception apparatus 120 determines whether a reply message in which an alternative address is described has been received (S224). If the data reception apparatus 120 has received the reply message with the alternative address, it transmits a request message based on the alternative address to the data transmission apparatus 100 (S225), and returns the process to step S223. If, for example, the data reception apparatus 120 has received message (5), it transmits the following request message.

GET /20110401-01.mp4 HTTP/1.1
Host: www.example.com
Accept: video/*
Range: t:npt=100-110 . . . (7)
:

If the data reception apparatus 120 has not received the reply message with the alternative address, it determines whether the received reply message (for example, message (6)) contains the segment data of the video content (S226). If the data reception apparatus 120 has received the reply message containing the segment data of the video content, it considers that reception of the requested segment data is complete, and returns the process to step S221.

If the reply message does not contain the segment data of the video content, and indicates an error, the data reception apparatus 120 executes error processing (S227), and returns the process to step S221.

●Content Information Registration Unit

Figure 5A:
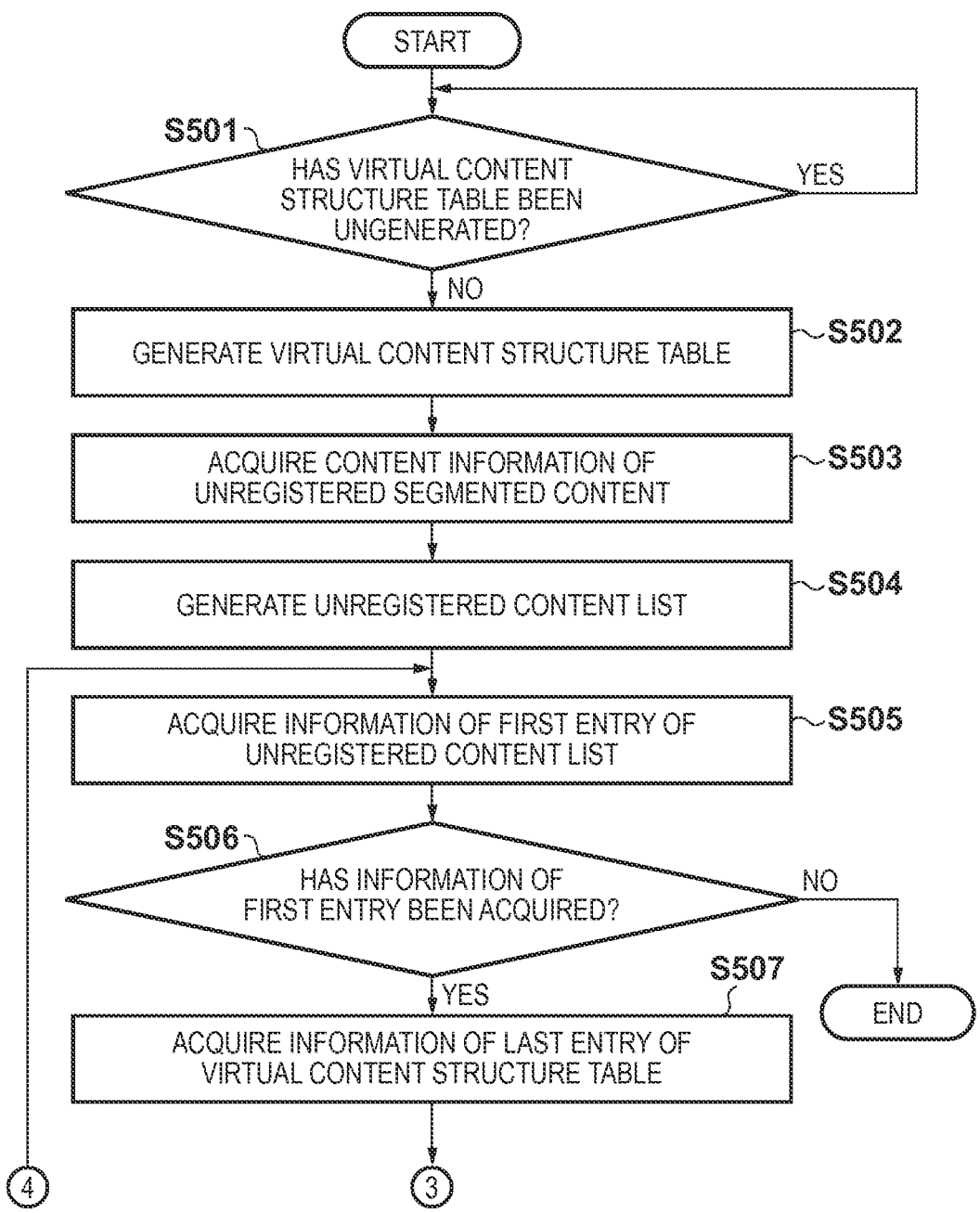
FIGS. 5A and 5B are flowcharts for explaining content registration processing by a content information registration unit.
Figure 5B:
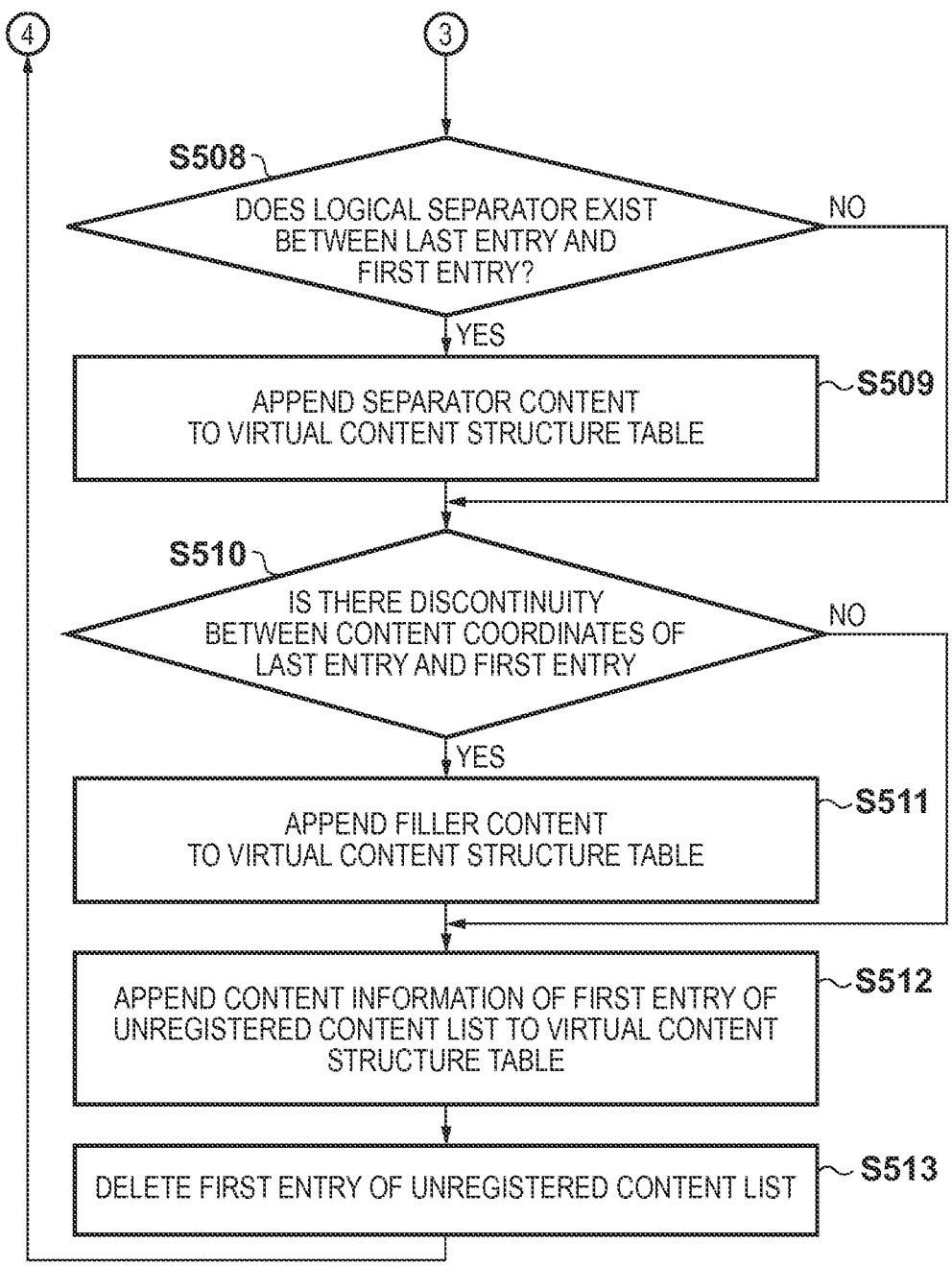

The content registration processing (S202) by the content information registration unit 102 will be described with reference to flowcharts shown in FIGS. 5A and 5B.

The content information registration unit 102 determines whether a virtual content structure table has been generated (S501). If a virtual content structure table has not been generated, the unit 102 generates, in, for example, the memory 112, a null virtual content structure table in which nothing is registered (S502). Note that a virtual content structure table may be generated in any storage medium in which data can be stored.

The content information registration unit 102 acquires, through the content reading unit 108, the content information for an unregistered segmented content, which is in the data storage device 130 (S503). The unit 102 generates, in the memory 112, a list (to be referred to as an unregistered content list hereinafter) in which the content identifiers of unregistered segmented contents are arranged in ascending order of content coordinates (S504). Note that an entry of the unregistered content list includes a content identifier, a content coordinate, and a content range.

Note that although a segmented content is assumed to have been stored in the data storage device 130 in the processing by the content information recording unit 101 in step S201, it may be acquired by any other method. Furthermore, although a segmented content stored in the data storage device 130 is assumed to have been generated when the data transmission apparatus 100 records or shoots an image, it may be generated by any other method, for example, by receiving it from another apparatus through the network.

The content information registration unit 102 acquires information for the first entry of the unregistered content list (S505), and determines whether entry information has been acquired (S506). If the unit 102 cannot acquire the entry information, that is, there is no entry, the content registration processing ends.

If the content information registration unit 102 has acquired the information for the first entry, it acquires information for the last entry of the virtual content structure table (S507), and determines whether a logical separator exists between the last entry and the first entry (S508). If there is a logical separator (for example, a date change point), the unit 102 appends a separator content to the virtual content structure table (S509). Note that if a date change point is determined as a logical separator, the unit 102 need only refer to, for example, a recording date/time described in each content coordinate.

After that, the content information registration unit 102 determines whether there is a discontinuity between the content coordinate of the last entry and that of the first entry (S510). If there is a discontinuity, the unit 102 appends a filler content to the virtual content structure table (S511). The presence/absence of a discontinuity is determined based on whether the content coordinate of the first entry is larger than the sum of the content coordinate and content range of the last entry.

For example, if the content coordinate indicates a recording start date/time and the content range indicates a recording time, the sum of the content coordinate and the content range indicates a recording end date/time. That is, if the recording start date/time of the first entry is after the recording end date/time of the last entry, a filler content is appended.

The content information registration unit 102 appends the content information for the first entry of the unregistered content list to the virtual content structure table (S512), deletes the first entry of the unregistered content list (S513), and then returns the process to step S505.

●Content Decision Processing

Figure 6B:
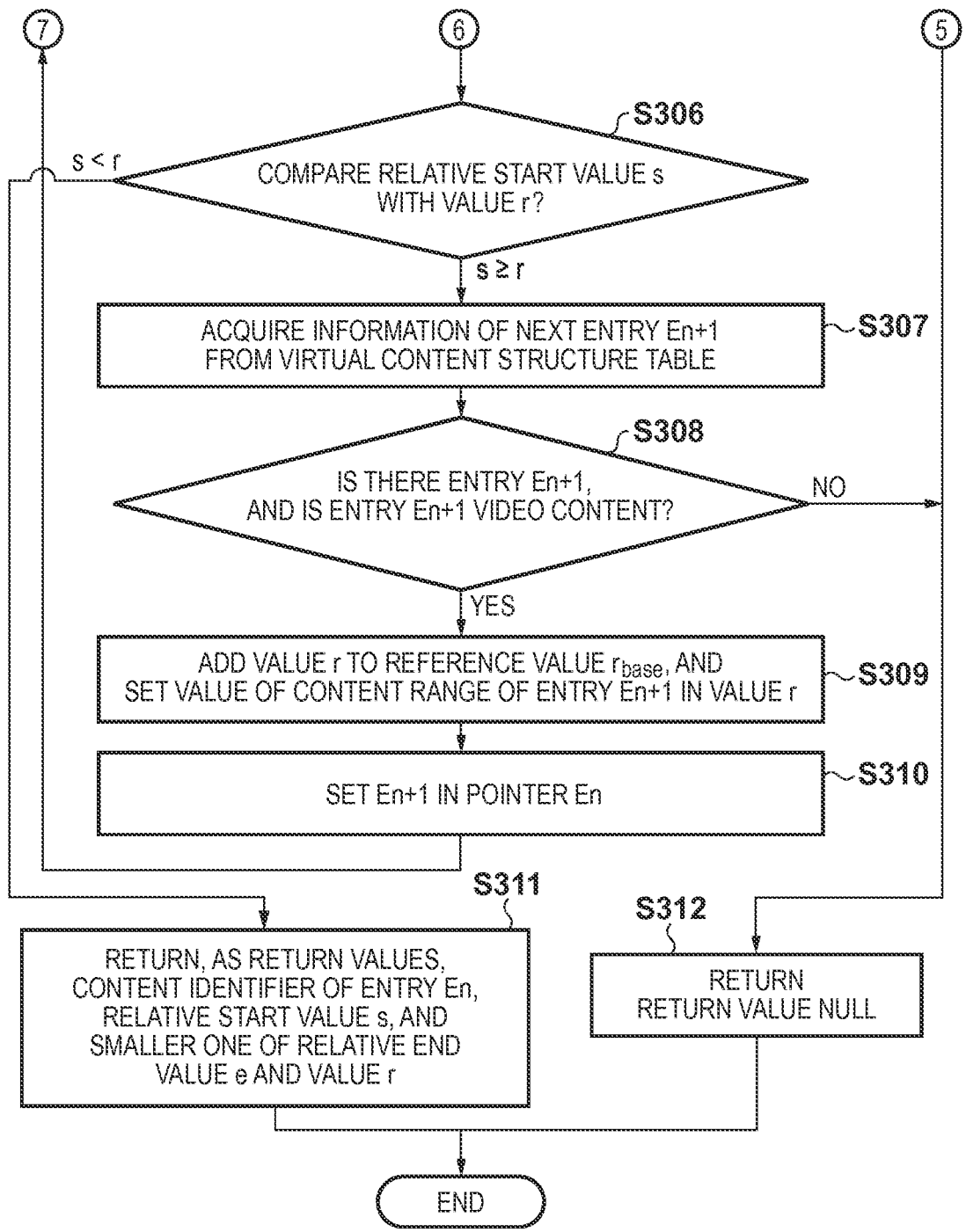

The content decision processing (S204) will be described with reference to flowcharts shown in FIGS. 6A and 6B.

A content identifier decision unit 104 searches, from the first entry of the virtual content structure table, for entry E0 with a content identifier which coincides with the content identifier contained in the request message (S301). A transmission range calculation unit 105 determines based on a search result whether there is entry E0 (S302). If there is no entry E0, the unit 105 returns a return value NULL for indicating that there is no entry with a content identifier which coincides with the content identifier contained in the request message (S312).

If there is entry E0, the transmission range calculation unit 105 sets "0" in a reference value $r_{base}$, and sets the value of the content range of entry E0 in a value r (S303). Furthermore, the unit 105 sets, for example, the record number of entry E0 in a pointer En indicating an entry being processed (S304).

If, for example, request message (2) has been received, the virtual content structure table shown in FIG. 3 includes an entry with a content identifier which coincides with the content identifier "20110401-00.mp4" contained in the request message. Therefore, "0" is set in the reference value $r_{base}$, and a value "7200" of the content range of the first entry is set in the value r.

Then, the transmission range calculation unit 105 calculates a relative start value s and a relative end value e by subtracting the reference value $r_{base}$ from a start value s0 and an end value e0 of the request range of the segment data contained in the request message, respectively (S305).

If, for example, request message (2) has been received, the start value s0 and the end value e0 of the request range of the segment data are "7300" and "7310" described in the Range header, respectively. Thus, the relative start value s=7300−0=7300 and the relative end value e=7310−0=7310 are obtained.

A transmission range comparison unit 106 compares the relative start value s with the value r (S306). If the relative start value s is smaller than the value r (s<r), the process advances to S311.

In request message (2) and the example of the virtual content structure table shown in FIG. 3, since the relative start value s=7300 and the value r=7200, the comparison result is s≥r. In this case, the transmission range calculation unit 105 acquires information for next entry En+1 from the virtual content structure table (S307), and determines whether there is entry En+1 and entry En+1 is a video content (S308). If there is no entry En+1 or entry En+1 is a filler content or separator content, the unit 105 returns a return value NULL for indicating that there is no entry which falls within the content request range (S312).

In the example of the virtual content structure table shown in FIG. 3, there is entry En+1 (the second entry in this example), and the content identifier of entry En+1 is neither [FILLER] nor [SEPARATOR]. The transmission range calculation unit 105, therefore, adds the value r to the reference value $r_{base}$ and sets the value of the content range of entry En+1 in the value r (S309). Furthermore, the unit 105 sets entry En+1 in the pointer En indicating an entry being processed (S310), and returns the process to step S305.

In the example of the virtual content structure table shown in FIG. 3, for example, the reference value $r_{base}$ is updated to "7200" and the value r is updated to a value "10800" of the content range of the second entry.

The transmission range calculation unit 105 returns the process to step S305, and calculates the relative start value s and the relative end value again. In this case, $s=s0-r_{base}=7300-7200=100$ and $e=e0-r_{base}=7310-7200=110$ are obtained. Then, the unit 105 performs a comparison in step S306. In this case, the result of a comparison of the relative start value s and the value r is s<r, the process advances to step S311.

If the comparison result is s<r, the transmission range calculation unit 105 returns, as return values, the content identifier of entry En, the relative start value s, and a smaller one of the relative end value e and the value r (Min(e, r)) (S311). Note that these return values are used as the value of a content identifier, a content start coordinate value, and a content end coordinate value on the request source side of the content decision processing.

In the example of the virtual content structure table shown in FIG. 3, for example, the content identifier is "20110401-01.mp4" and the content start coordinate value is "100". Furthermore, Min(110, 10800)=110 and thus the content end coordinate value is "110".

As described above, when a request which designates a partial range of a video content is received, it is possible to transmit data for the designated range even if data for the designated range exists not in the video content but in another video content. The data reception apparatus 120, therefore, can request data for a desired range, and acquire it without considering whether a designated video content contains the data for the necessary range. Especially, it is possible to prevent unnecessary consumption of a network band or memory due to transmission of needless data as compared with a case in which the whole video content is transmitted when data for an invalid rage is requested.

Second Embodiment

Information processing according to the second embodiment of the present invention will be described below. Note that the same components as those in the first embodiment have the same reference numerals in the second embodiment, and a detailed description thereof will be omitted.

Figure 8:
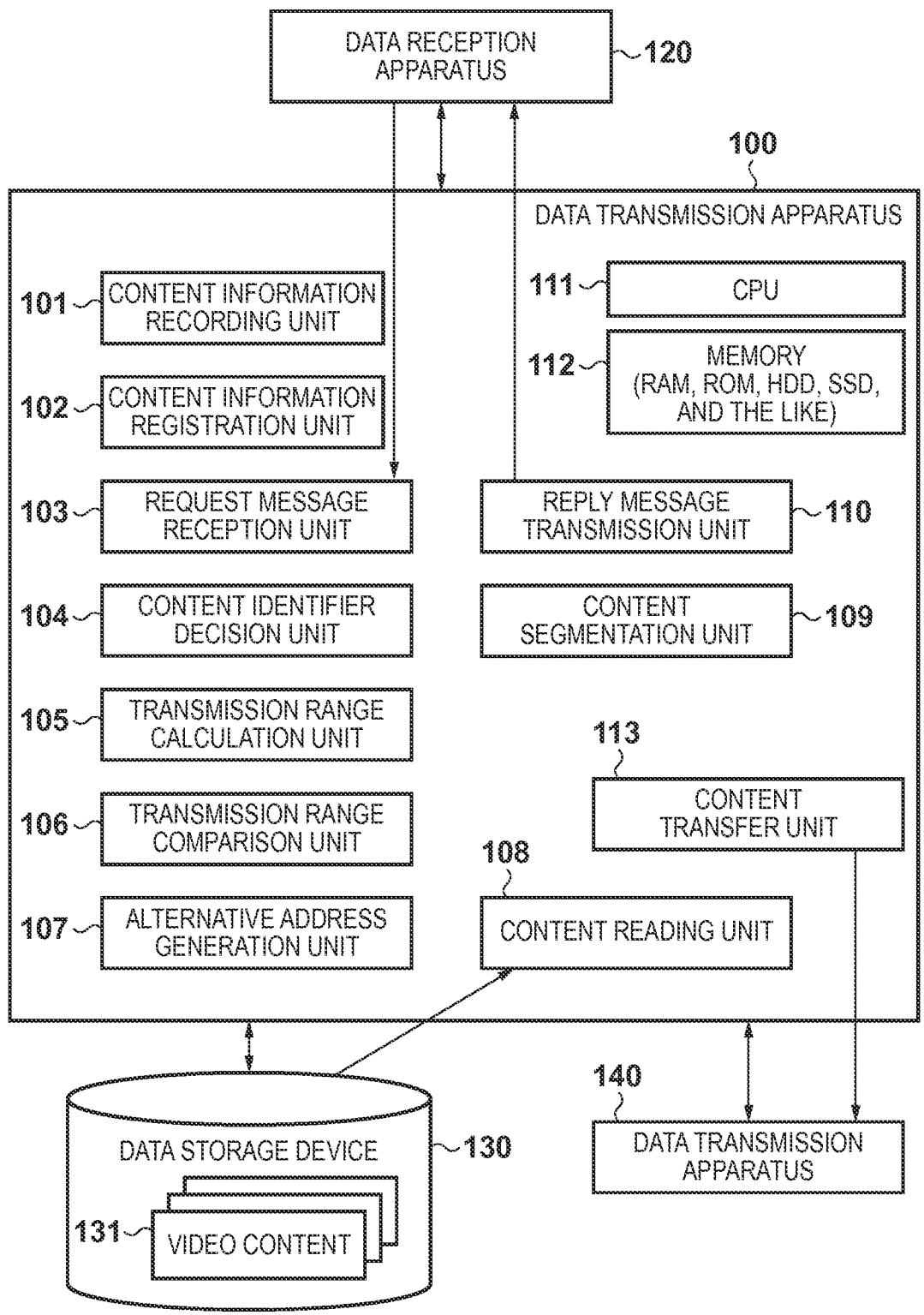
FIG. 8 is a block diagram for explaining the configuration of a multimedia content transmission/reception system according to the second embodiment.

The configuration of a multimedia content transmission/reception system according to the second embodiment will be described with reference to a block diagram shown in FIG. 8.

A content transfer unit 113 of a data transmission apparatus 100 according to the second embodiment transfers at least some of video contents 131 in a data storage device 130 to another data transmission apparatus 140. The unit 113 corresponds to, for example, a system in which the data transmission apparatus 100 is a small surveillance camera, and recorded video data is transferred to a mass storage server as the other data transmission apparatus 140 through a network.

Figure 9A:
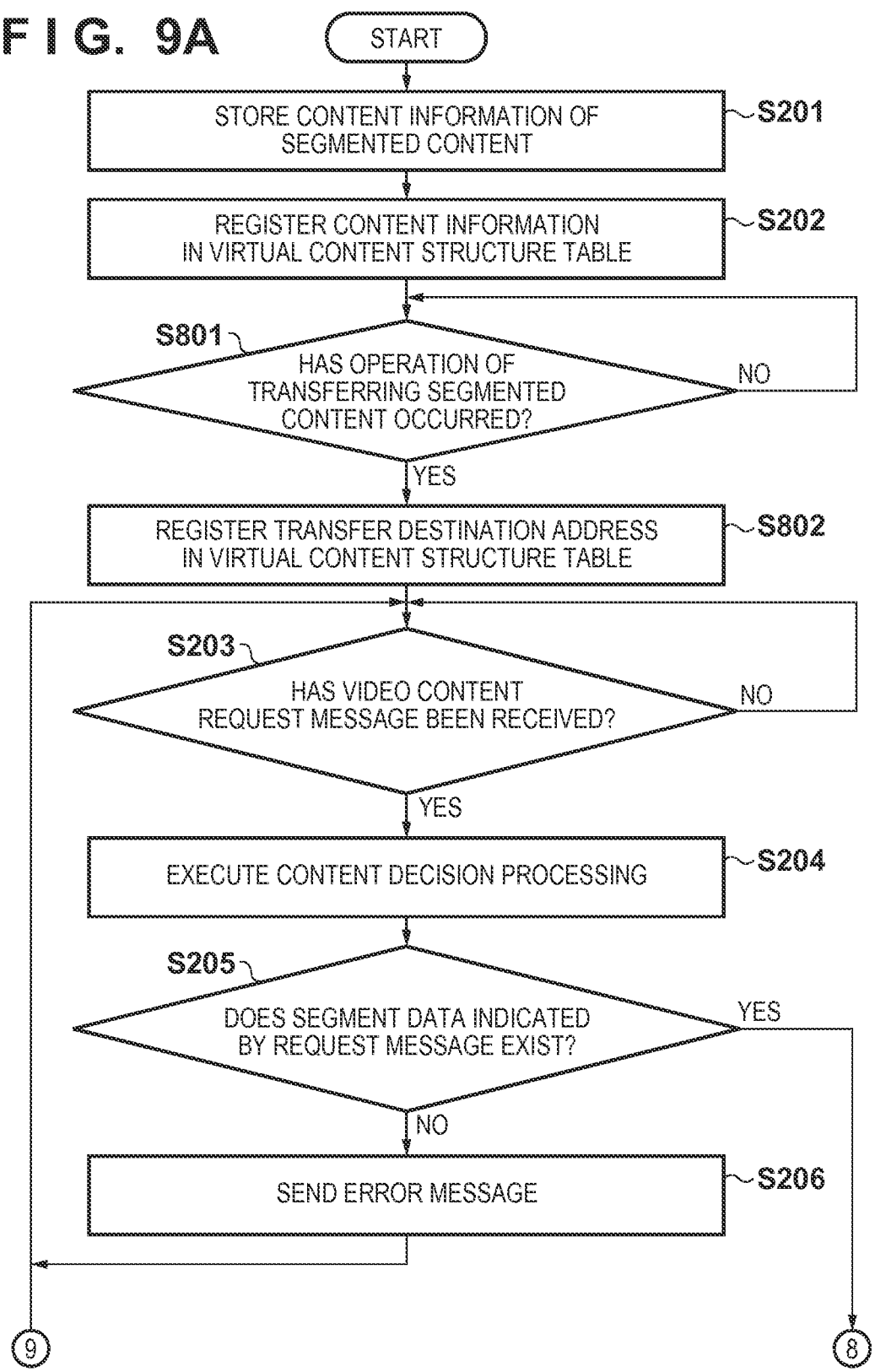
FIGS. 9A and 9B are flowcharts for explaining the operation of a data transmission apparatus.
Figure 9B:
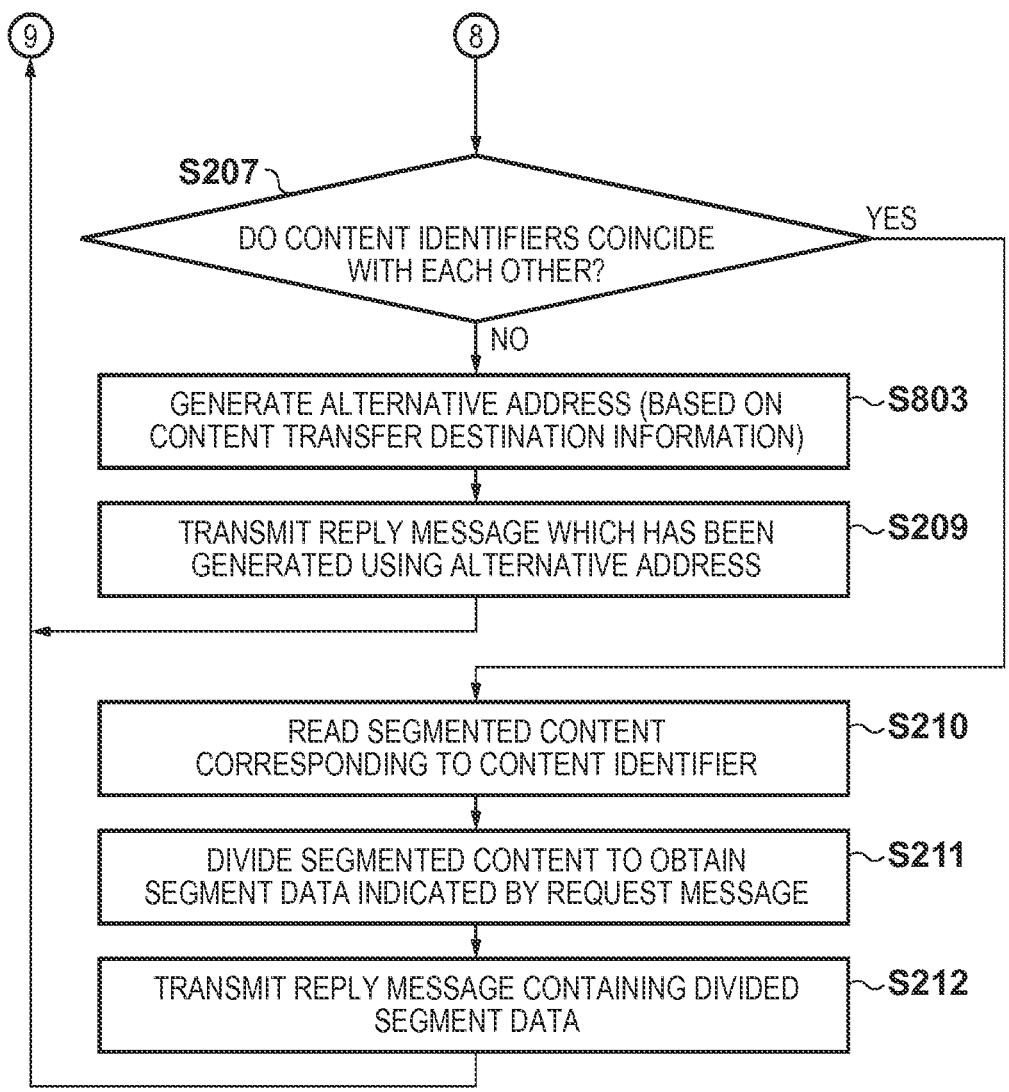

The operation of the data transmission apparatus 100 will be described with reference to a flowchart shown in FIG. 9. Note that the same processes as those shown in FIG. 2 have the same reference symbols, and a detailed description thereof will be omitted.

A CPU 111 determines whether an operation of transferring a segmented content by the content transfer unit 113 has occurred (S801). If the transfer operation has occurred, the CPU 111 causes a content information registration unit 102 to register a URI (address information) indicating a transfer destination address in a virtual content structure table (S802).

FIG. 10 shows an example of the virtual content structure table according to the second embodiment. As compared with the example shown in FIG. 3, a content transfer destination column 404 in which a transfer destination address is registered is added. Note that an initial value (N/A) is registered in the content transfer destination column 404 for untransferred segmented contents, a filler content, and a separator content.

If the return value of content decision processing is not NULL and a comparison result in step S207 indicates that content identifiers are different from each other, the CPU 111 causes an alternative address generation unit 107 to generate an alternative address indicating the position of alternative data (S803). At this time, if the content transfer destination column 404 of the segmented content in the virtual content structure table is N/A, the alternative address generation unit 107 generates an alternative address similarly to step S208 in the first embodiment. On the other hand, if a URI has been registered in the content transfer destination column 404 of the segmented content in the virtual content structure table, the URI registered in the content transfer destination column 404 is used as an alternative address.

Note that if, for example, an interrupt indicating an event of newly storing a segmented content in the data storage device 130 occurs while standing by for reception of a video content request message, the CPU 111 returns the process to step S201. If an interrupt indicating a transfer of a segmented content occurs, the CPU 111 returns the process to step S801.

Figure 11:
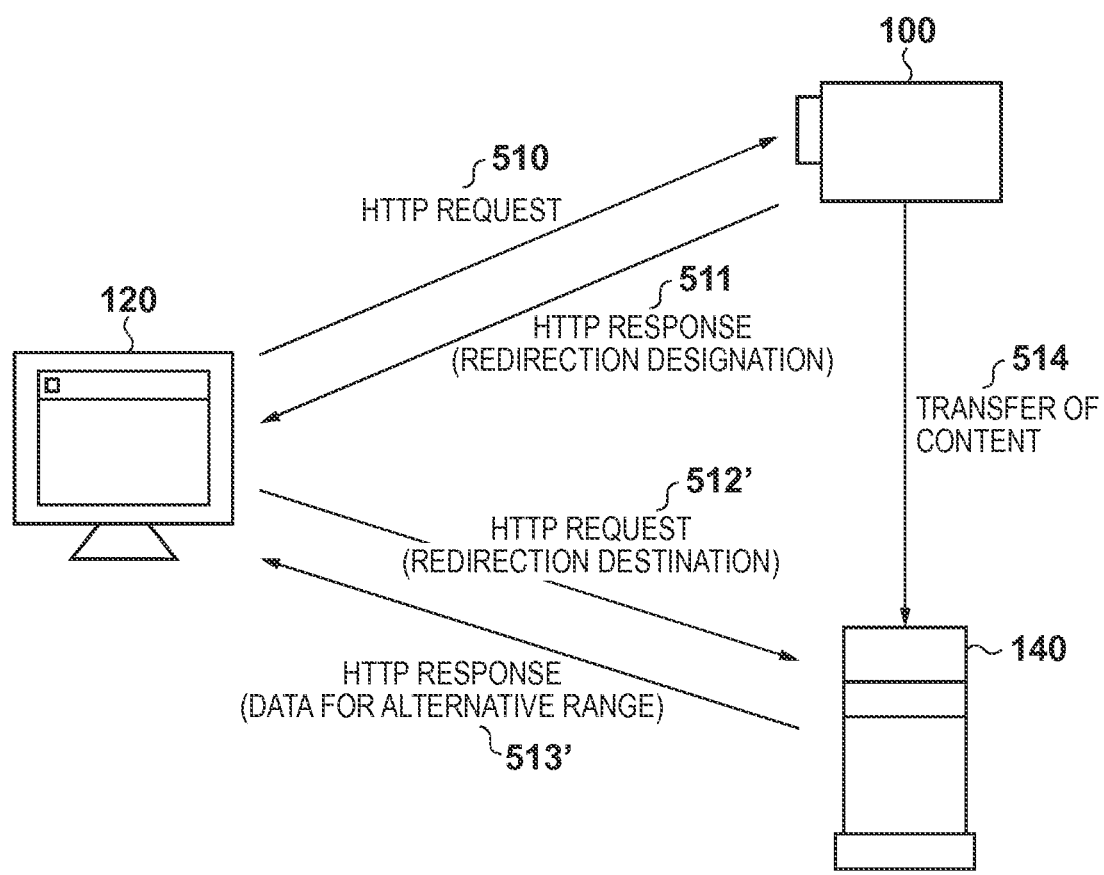
FIG. 11 is a view for explaining a message flow between a data reception apparatus, a data transmission apparatus, and another data transmission apparatus using the HTTP protocol.

FIG. 11 is a view for explaining a message flow between a data reception apparatus 120, the data transmission apparatus 100, and another data transmission apparatus 140 using the HTTP protocol. A message 514 corresponds to a message for transferring a video content from the data transmission apparatus 100 to the other data transmission apparatus 140, and a POST instruction or the like is used for the HTTP protocol.

A message 510 corresponds to a request message which is received by the data transmission apparatus 100 from the data reception apparatus 120 in step S203. A message 511 corresponds to a reply message which is transmitted from the data transmission apparatus 100 to the data reception apparatus 120 in step S209. A message 512' corresponds to a request message (indicating a redirection destination) which is received by the data transmission apparatus 140 from the data reception apparatus 120 in response to the message 511. A message 513' corresponds to a reply message which contains data for an alternative range and is transmitted from the data transmission apparatus 140 to the data reception apparatus 120.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-241527, filed Nov. 2, 2011, which is hereby incorporated by reference herein in its entirety.

What is claimed is:

1. An information processing apparatus comprising:
a receiver configured to receive a request message indicating a requested content identifier and a requested data range of a requested digital content, wherein the requested data range corresponds to a part of the requested digital content;
a determiner configured to determine whether a digital content corresponding to the requested content identifier includes the requested data range;
a decider configured to decide a content identifier and a data range of a digital content to be used when responding to the request message, based on a determination by the determiner; and
a transmitter configured to transmit a reply message to the request message based on a decision by the decider,
wherein, in a case where it is determined that the digital content corresponding to the requested content identifier does not include the requested data range, the decider decides an alternative content identifier different from the requested content identifier and an alternative data range indicating a segment of a digital content having the alternative content identifier, and the segment corresponds to the part of the requested digital content, and
wherein at least one of the receiver, the determiner, the decider, and the transmitter is implemented using a processor.

2. The apparatus according to claim 1, further comprises a memory which stores, as a plurality of digital contents, digital contents segmented from a digital content,
wherein the determiner determines whether the digital content, which corresponds to the requested content identifier and is comprised in the plurality of the digital contents stored in the memory, includes the requested data range.

3. The apparatus according to claim 2, further comprising a generator configured to generate a table in which content information for the plurality of digital contents stored in the memory and a relation between the plurality of digital contents are registered, wherein the determiner performs the determination referring to the table, and the detector performs the decision referring to the table.

4. The apparatus according to claim 3, wherein the generator registers a plurality of content information for the plurality of digital contents in the table in an order of content coordinates of the plurality of digital contents to indicate the relation between the plurality of digital contents.

5. The apparatus according to claim 4, wherein in a case where there is a gap between the content coordinates of the plurality of digital contents, the generator registers, in the table, a symbol indicating that there is no digital content corresponding to the content coordinate.

6. The apparatus according to claim 4, wherein the generator registers, in the table, a symbol indicating a logical separator between the plurality of digital contents.

7. The apparatus according to claim 4,
wherein the determiner performs a first determination whether the digital content corresponding to the requested content identifier exists in the memory, and a second determination whether a digital content includes the requested data range, and
wherein in a case where a result of the first determination indicates presence of the digital content corresponding to the requested content identifier, and a result of the second determination indicates that the digital content corresponding to the requested content identifier does not include the requested data range, the decider determines whether there is content information which is registered next to the content information for the digital content corresponding to the requested content identifier, and determines, if there is the next content information, whether a next digital content corresponding to the next content information includes the requested data range.

8. The apparatus according to claim 7, wherein, in a case where the next digital content includes the requested data range, the decider decides a content identifier and a corresponding data range of the next digital content as the alternative content identifier and the alternative data range.

9. The apparatus according to claim 8, wherein the transmitter transmits a message containing the alternative content identifier and the alternative data range as a reply message to the request message.

10. The apparatus according to claim 7, wherein, in a case where the result of the first determination indicates presence of the digital content corresponding to the requested content identifier, and the result of the second determination indicates that the digital content corresponding to the requested content identifier includes the requested data range, the transmitter divides the digital content corresponding to the requested content identifier to obtain segment data corresponding to the requested data range, and transmits a message containing the segment data as a reply message to the request message.

11. The apparatus according to claim 7, wherein in a case where the result of the first determination indicates absence of the digital content corresponding to the requested content identifier, the transmitter transmits an error message as a reply message to the request message.

12. The apparatus according to claim 3, further comprising a forward section configured to transfer at least some of the plurality of digital contents stored in the memory to another storage through a network,
wherein the generator registers address information of a transfer destination of the transferred digital content in the table.

13. The apparatus according to claim 1, wherein, in a case where it is determined that the digital content corresponding to the requested content identifier includes the requested data range, the transmitter divides the digital content corresponding to the requested content identifier to obtain segment data corresponding to the requested data range, and transmits a message containing the segment data as a reply message to the request message.

14. The apparatus according to claim 1, wherein the digital content is a segmented content composing a series of video contents, and content information indicating recoding start date/time and recording time is added to each segmented content, and wherein the receiver receives a content identifier indicating a segmented content of the series of video contents and a data range indicating recording start date/time and recoding end date/time as the requested massage.

15. The apparatus according to claim 14, wherein the receiver receives the requested massage described based on Hyper Text Transfer protocol (HTTP), and the data range contained in the request message is described using media fragment URI (uniform resource identifier), and
wherein the transmitter transmits the reply message using a redirect function of HTTP.

16. The apparatus according to claim 14, further comprising a forward section configured to transfer at least some of segmented contents composing the series of video contents to another apparatus capable of transferring data, and record a transfer destination of the transferred segmented content, wherein, in a case where the determiner determines that segmented data corresponding to the requested content identifier has been transferred, the decider decides a content identifier to distinguish the segmented data in the transfer destination as the alternative content identifier.

17. The apparatus according to claim 16, wherein the information processing apparatus comprises a surveillance camera and transfers recorded video contents to the other apparatus through a network, and the other apparatus comprises a storage server.

18. An information processing method comprising:
using a processor to perform the steps of:
receiving a request message indicating a requested content identifier and a requested data range of a requested digital content, wherein the requested data range corresponds to a part of the requested digital content;
determining whether a digital content corresponding to the requested content identifier includes the requested data range;
deciding a content identifier and a data range of a digital content to be used when responding to the request message, based on the determination in the determining step; and
transmitting a reply message to the request message based on the decision in the deciding step,
wherein, in a case where it is determined that the digital content corresponding to the requested content identifier does not include the requested data range, an alternative content identifier different from the requested content identifier and an alternative data range indicating a segment of a digital content having the alternative content identifier are decided in the deciding step, where the segment corresponds to the part of the requested digital content.

19. A non-transitory computer-readable medium storing a computer-executable program for causing a computer to perform an information processing method, the method comprising the steps of:
receiving a request message indicating a requested content identifier and a requested data range of a requested digital content, wherein the requested data range corresponds to a part of the requested digital content;
determining whether a digital content corresponding to the requested content identifier includes the requested data range;
deciding a content identifier and a data range of a digital content to be used when responding to the request message, based on the determination in the determining step; and
transmitting a reply message to the request message based on the decision in the deciding step,
wherein, in a case where it is determined that the digital content corresponding to the requested content identifier does not include the requested data range, an alternative content identifier different from the requested content identifier and an alternative data range indicating a segment of a digital content having the alternative content identifier are decided in the deciding step, where the segment corresponds to the part of the requested digital content.

* * * * *